May 22, 1956          A. B. UTLEY          2,746,234
LEAF RAKE
Filed Feb. 17, 1954
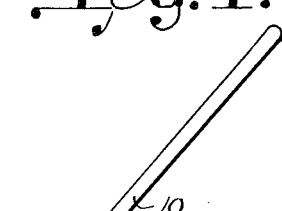
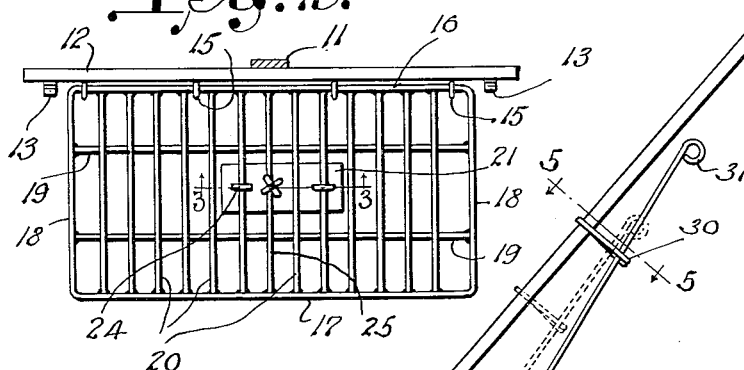
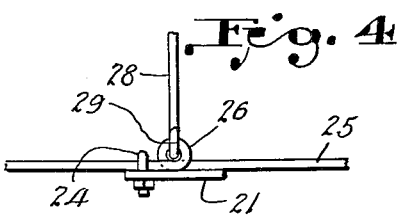
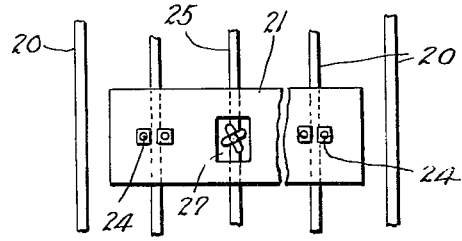
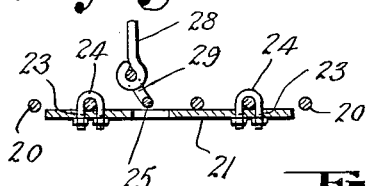
INVENTOR,
Arthur B. Utley.
BY
E. E. Vrooman & Co.,
ATTORNEYS.
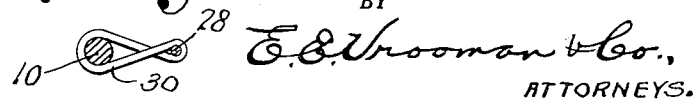

United States Patent Office 2,746,234
Patented May 22, 1956

2,746,234
LEAF RAKE

Arthur B. Utley, Springfield, Mo.

Application February 17, 1954, Serial No. 410,764

2 Claims. (Cl. 56—400.12)

This invention relates to a garden rake and has special reference to a garden rake provided with a trash gripping device.

One important object of the invention is to improve the general construction of devices of this character.

A second important object of the invention is to provide a tooth gripping jaw for a rake of this character and having special means for supporting and actuating the gripping jaw.

A third important object of the invention is to provide a brace plate for the gripping jaw of the invention and means of novel character for connecting the gripping jaw to the operating means.

With the above and other objects in view, the invention consists in general of certain novel details of construction and combinations of parts hereinafter fully described, illustrated in the accompanying drawings, and particularly claimed.

In the accompanying drawings, like characters of reference indicate like parts in the several views, and:

Figure 1 is a side elevation of a rake constructed in accordance with this invention, the rake being provided with a gripping jaw shown open in full lines and in closed position in broken lines.

Figure 2 is a section on the line 2—2 of Figure 1.

Figure 3 is an enlarged section on the line 3—3 of Figure 2.

Figure 4 is an enlarged and elevational view of the plate and teeth.

Figure 5 is a section on the line 5—5 of Figure 1.

Figure 6 is an enlarged fragmentary view of the bottom of a portion of the gripping device.

In the embodiment of the invention as herein shown there is provided a rake having an elongated handle 10 in the lower end of which is fitted a socket 11 supporting a transverse plate 12 from which extends rake teeth 13 curved in the usual manner in their ends as indicated 14. Extending from the under side of the plate 12 adjacent to upper end is a series of spaced eyes 15. Through these eyes extends one side of a rectangular framed member 16 having a side 17 spaced vertically and parallel to the side 16, these sides being connected at their ends by members 18. Between the members 18 extend brace members 19. The members 16 and 17 are connected by curved teeth 20.

Beneath the curved teeth 20 extends a plate 21 which lies parallel to the members 19 and is located between these members. The plate 21 as adjacent its ends openings 23 where through pass U-bolts 24 securing plate to at least two of the teeth 20. Between the two teeth here shown carrying the U-bolts above mentioned there extends a tooth 25 which has an eye forming convolution 26 intermediate its ends. This convolution registers at an opening 27 formed in the plate 21.

At 28 is an operating rod having an eye 29 at its lower end which interlocks with the convolution at the upper side of the plate 21. This operating rod 28 is connected to the handle 10 by means of an 8-shaped strap 30 and the handle and the rod 28 is provided at its upper end with a hand grip 31.

In the operation of the device, the grass, leaves, or the like that are desired to be raked up are raked up with the gripping device in the position shown in full lines in Figure 1. When a mass of these leaves or the like have been gathered together then the operator pushes down on the rod 28 and this moves the gripping device to the position shown in broken lines in Figure 1 so that the entire bundle of trash is gripped and may be picked up and deposited in any convenient receptacle. It is obvious that minor changes may be made in the form and instruction of this invention without departing from the material principels thereof. It is not therefore desired to confine the invention to the exact form shown and described but it is wished to include all such as properly common within the scope claimed.

What is claimed is:

1. In a handled rake, a rigid supporting plate extending transversely of the rake and having rake fingers projecting forwardly therefrom in combination with a gripper hinged to said plate, said gripper having an elongated rectangular frame pivoted to the plate, and having a plurality of spaced grip teeth extending from said plate, a bracing plate mounted on and extending transversely of said grip teeth substantially centrally of said frame, an operating handle pivoted to the bracing plate centrally thereof and extending along the rake handle, said bracing plate having U-bolts extending therethrough and securing said spaced grip teeth to the bracing plate, one of the grip teeth having a convolution intermediate its ends forming the means for attachment of the operating rod.

2. In a handled rake, a rigid supporting plate extending transversely of the rake and having rake fingers projecting forwardly therefrom in combination with a gripper hinged to said plate, said gripper having an elongated rectangular frame pivoted to the plate, and having a plurality of spaced grip teeth extending from said plate, a bracing plate mounted on and extending transversely of said grip teeth substantially centrally of said frame, an operating handle pivoted to the bracing plate centrally thereof and extending along the rake handle, said bracing plate having U-bolts extending therethrough and securing said spaced grip teeth to the bracing plate, one of the grip teeth having a convolution intermediate its ends forming the means for attachment of the operating rod, and 8-shaped strap, said rod extending through the outer loop of said strap and fixedly secured thereto and the inner loop of said strap being freely slidable on said handle.

References Cited in the file of this patent

UNITED STATES PATENTS

| | | |
|---|---|---|
| 715,694 | Richards | Dec. 9, 1902 |
| 1,751,481 | La Tourrette | Mar. 25, 1930 |
| 1,939,475 | Walsh | Dec. 12, 1933 |
| 2,504,943 | Zifferer | Apr. 18, 1950 |